United States Patent
Brown et al.

(10) Patent No.: US 8,955,125 B2
(45) Date of Patent: *Feb. 10, 2015

(54) SNOOP ECHO RESPONSE EXTRACTOR

(75) Inventors: Tristan Anthony Brown, Keller, TX (US); Shawn Patrick Mullen, Buda, TX (US); Venkat Vankatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/306,794

(22) Filed: Nov. 29, 2011

(65) Prior Publication Data

US 2012/0079595 A1    Mar. 29, 2012

Related U.S. Application Data

(63) Continuation of application No. 11/284,682, filed on Nov. 22, 2005, now Pat. No. 8,082,586.

(51) Int. Cl.
     *H04L 29/06*      (2006.01)
(52) U.S. Cl.
     CPC ...... *H04L 29/06877* (2013.01); *H04L 63/1408* (2013.01); *H04L 29/06891* (2013.01); *H04L 63/1491* (2013.01); *H04L 63/145* (2013.01); *H04L 63/1466* (2013.01); *H04L 63/1475* (2013.01)
     USPC ............ 726/23; 726/22; 726/24; 726/25; 713/187; 713/188; 713/193; 713/194

(58) Field of Classification Search
     CPC ............... H04L 29/06877; H04L 63/1408; H04L 63/1491
     USPC ............ 713/187–188, 192–194; 726/22–25
     See application file for complete search history.

(56) References Cited

U.S. PATENT DOCUMENTS

| | | | |
|---|---|---|---|
| 6,775,657 B1 * | 8/2004 | Baker | 706/45 |
| 7,114,070 B1 | 9/2006 | Willming et al. | |
| 7,174,566 B2 | 2/2007 | Yadav | |
| 7,237,267 B2 | 6/2007 | Rayes et al. | |
| 7,320,070 B2 | 1/2008 | Baum | |
| 7,346,922 B2 | 3/2008 | Miliefsky | |
| 8,082,586 B2 | 12/2011 | Brown et al. | |
| 8,667,581 B2 * | 3/2014 | Steeves et al. | 726/22 |
| 2004/0071164 A1 | 4/2004 | Baum | |

(Continued)

FOREIGN PATENT DOCUMENTS

| | | |
|---|---|---|
| EP | 1370027 A1 | 12/2003 |
| JP | 2002232463 A | 8/2002 |

OTHER PUBLICATIONS

"Internet Snoop Deceiver," IBM Research Disclosure No. 428117, pp. 1682, Dec. 1999.

(Continued)

*Primary Examiner* — Josnel Jeudy
(74) *Attorney, Agent, or Firm* — Yee & Associates, P.C.; Parashos Kalaitzis

(57) ABSTRACT

A mechanism is provided for identifying a snooping device in a network environment. A snoop echo response extractor generates an echo request packet with a bogus MAC address that will only be received by a snooping device. The snoop echo response extractor also uses an IP address that will cause the snooping device to respond to the echo request.

20 Claims, 5 Drawing Sheets

(56) References Cited

U.S. PATENT DOCUMENTS

2005/0044418 A1 2/2005 Miliefsky
2007/0118908 A1 5/2007 Brown et al.

OTHER PUBLICATIONS

PROROCK, "Security Feature for Local Area Network Switches," IBM Technical Disclosure Bulletin, 39(9):137-144, Sep. 1996.
Office Action, dated May 19, 2009, regarding U.S. Appl. No. 11/284,682, 12 pages.
Response to Office Action, dated Aug. 4, 2009, regarding U.S. Appl. No. 11/284,682, 14 pages.
Final Office Action, dated Nov. 30, 2009, regarding U.S. Appl. No. 11/284,682, 15 pages.
Response to Final Office Action, dated Mar. 18, 2010, regarding U.S. Appl. No. 11/284,682, 8 pages.
Appeal Brief, dated Apr. 20, 2010, regarding U.S. Appl. No. 11/284,682, 26 pages.
Office Action, dated Jul. 6, 2010, regarding U.S. Appl. No. 11/284,682, 14 pages.
Response to Office Action, dated Oct. 6, 2010, regarding U.S. Appl. No. 11/284,682, 10 pages.
Final Office Action, dated Dec. 16, 2010, regarding U.S. Appl. No. 11/284,682, 18 pages.
Appeal Brief, dated May 10, 2011, regarding U.S. Appl. No. 11/284,682, 22 pages.
Notice of Allowance, dated Aug. 8, 2011, 2010, regarding U.S. Appl. No. 11/284,682, 16 pages.
Spangler, "Packet Sniffer Detection with AntiSniff," University of Wisconsin at Whitewater, Department of Computer and Network Administration, May 2003, 8 pages.

* cited by examiner

```
             SOURCE MAC    DESTINATION
              ADDRESS      MAC ADDRESS           FIG. 5A
ETH:   ====(1458 bytes transmitted on interface en2 )==== 13:32:15.589127638
ETH:   [ srcMACaddr -> dstMACaddr ] type 800 (IP)
IP:    < SRC =   192.168.86.42 > (src.xyz.com)
IP:    < DST = 192.168.86.239 > (dst.xyz.com)
IP:    ip_v=4, ip_hl=20, ip_tos=0, ip_len=1444, ip_id=61027, ip_off=0 DF
IP:    ip_ttl=225, ip_sum=920a, ip_p=1 (ICMP)
ICMP:    icmp_type=8 (ECHO_REQUEST) icmp_id=0 icmp_seq=2
```

```
                BOGUS MAC
                 ADDRESS                      FIG. 5B
ETH:   ====(1458 bytes transmitted on interface en2 )==== 13:32:15.589127638
ETH:   [ srcMACaddr -> bogusMACaddr ] type 800 (IP)
IP:    < SRC =   192.168.86.42 > (src.xyz.com)
IP:    < DST = 192.168.86.239 > (dst.xyz.com)    —— VALID IP ADDRESS
IP:    ip_v=4, ip_hl=20, ip_tos=0, ip_len=1444, ip_id=61027, ip_off=0 DF
IP:    ip_ttl=225, ip_sum=920a, ip_p=1 (ICMP)
ICMP:    icmp_type=8 (ECHO_REQUEST) icmp_id=0 icmp_seq=2
```

```
                BOGUS MAC
                 ADDRESS                      FIG. 5C
ETH:   ====(1458 bytes transmitted on interface en2 )==== 13:32:15.589127638
ETH:   [ srcMACaddr -> bogusMACaddr ] type 800 (IP)
IP:    < SRC =   192.168.86.42 > (src.xyz.com)
IP:    < DST = 255.255.255.0 > (dst.xyz.com)    —— BROADCAST IP ADDRESS
IP:    ip_v=4, ip_hl=20, ip_tos=0, ip_len=1444, ip_id=61027, ip_off=0 DF
IP:    ip_ttl=225, ip_sum=920a, ip_p=1 (ICMP)
ICMP:    icmp_type=8 (ECHO_REQUEST) icmp_id=0 icmp_seq=2
```

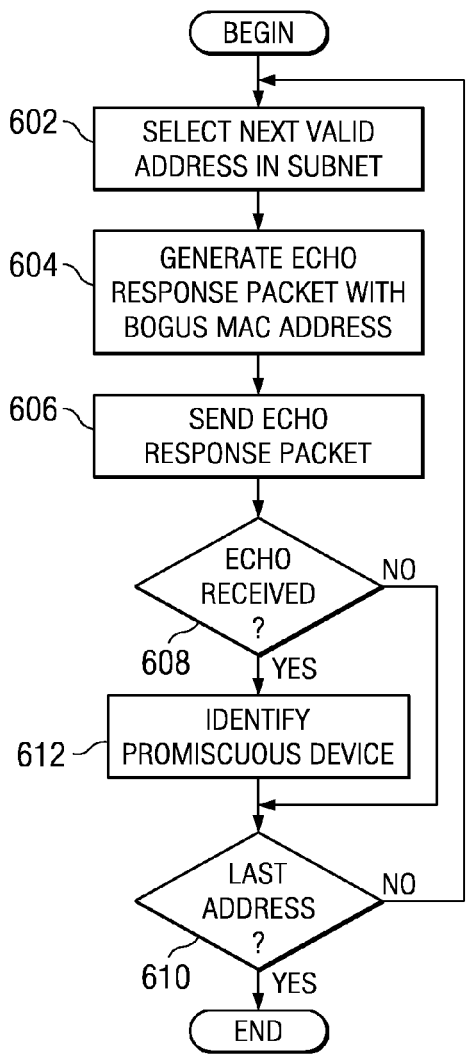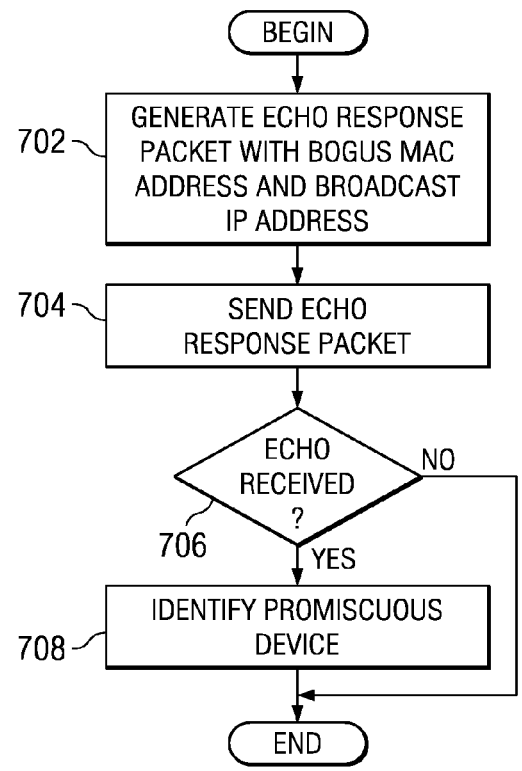

SNOOP ECHO RESPONSE EXTRACTOR

This application is a continuation of application Ser. No. 11/284,682, filed Nov. 22, 2005, now U.S. Pat. No. 8,082,586 issued Dec. 20, 2011.

BACKGROUND OF THE INVENTION

1. Field of the Invention:

The present invention relates generally to the data processing field and, more particularly, to network security. Still more particularly, the invention pertains to a method, apparatus, and program for extracting an echo response from a snooping device in a network data processing system.

2. Description of the Related Art:

A great deal of effort is directed to developing network security products that detect and respond to security threats. The two most common techniques used by hackers are port scans and network snooping. Network snooping is particularly dangers because the snoop passively listens on the network to all traffic and gathers information on user identifications and passwords.

The problem of detecting someone snooping on the network may be understood by considering a group of people sitting around a dinner table. The people are blindfolded. Each person can talk to the others through direct conversation. Everyone agrees that they will not listen in on any conversation not directed to him. However, a rogue participant may sit at or near the table and eavesdrop on all of the conversations. Additionally, the rogue may speak in a legitimate manner at the table. The people may not know of the rogue's presence. Even if they did know of the presence of the rogue, they would not know the identity of the rogue.

In a similar manner, a hacker may modify a computer device to eavesdrop on network traffic. For example, a temporary employee may set up a computer in snoop mode to record user identifications and passwords. With a valid user identification and password, a hacker could gain access to sensitive information, for example. A hacker may hide in a stairwell with a laptop computer, within range of a wireless router, and steal confidential information.

SUMMARY OF THE INVENTION

The present invention recognizes the disadvantages of the prior art and provides a technique for extracting a response from a snooping device in a computer network. A packet source device connected to the computer network generates an echo request packet having a bogus hardware address and a valid network protocol address. The packet source device sends the echo request packet on the computer network. Responsive to receiving an echo response packet on the computer network, the packet source device identifies a presence of a snooping device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A-5C illustrate example echo request packets in accordance with exemplary aspects of the present invention;

FIG. 6 is a flowchart illustrating operation of a snoop echo response extractor using cycled IP addresses in accordance with an exemplary embodiment of the present invention; and FIG. 7 is a flowchart illustrating operation of a snoop echo response extractor using a broadcast IP address in accordance with an exemplary embodiment of the present invention.

DETAILED DESCRIPTION OF THE PREFERRED EMBODIMENT

Figure 1:
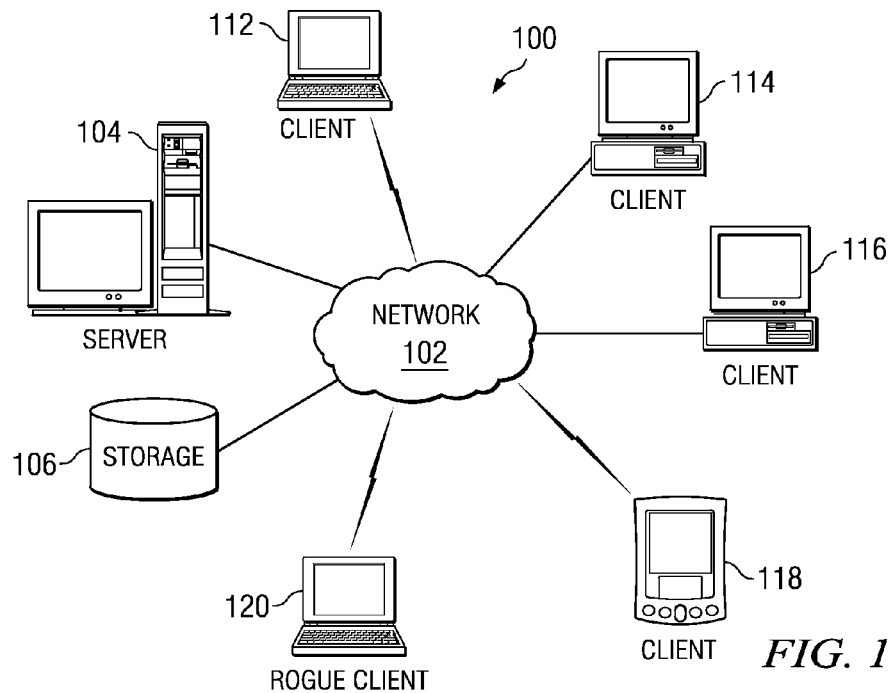
FIG. 1 depicts a pictorial representation of a network of data processing systems in which aspects of the present invention may be implemented.
Figure 2:
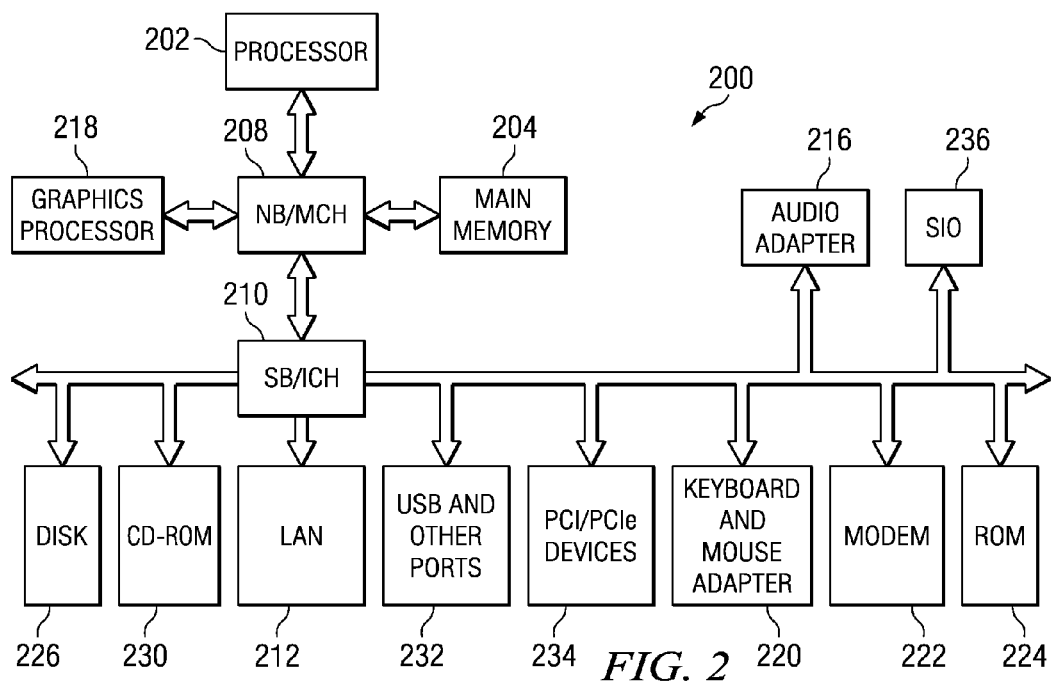
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and storage 106 connect to network 102. In addition, clients 112, 114, 116, and 118 connect to network 102. These clients 112, 114, 116, 118 may be, for example, personal computers or network computers. More particularly, client 112 may be a laptop computer connected to network 102 through wireless communications. Clients 114 and 116, for example, may be desktop computers. Client 118 may be a personal digital assistant (PDA), tablet computer, or telephone device, for example. In the depicted example, server 104 provides data, such as boot files, operating system images, data files, and applications to clients 112, 114, 116, and 118. Clients 112, 114, 116, and 118 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which exemplary aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

Local area network (LAN) adapter 212 connects to south bridge and I/O controller hub 204. Audio adapter 216, keyboard and mouse adapter 220, modem 222, read only memory (ROM) 224, hard disk drive (EDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Returning to FIG. 1, rogue client 120 is also connected to network 102. Rogue client 120 may be an unauthorized computing device that operates in snoop mode to receive and record network traffic on network 102. For example, a temporary employee may set up a computer in snoop mode to record user identifications and passwords. With a valid user identification and password, a hacker could gain access to sensitive information, for example. A hacker may hide in a stairwell with a laptop computer, such as rogue client 120 in the depicted example, within range of a wireless router in network 102, and steal confidential information.

One solution may be to simulate a conversation about logging into a fictitious server with a fictitious user identification and password. The rogue would then attempt the same conversation.

In accordance with exemplary aspects of the present invention, a device on the network generates an echo response packet to which no other device should respond. Using the manner in which packets are handled differently in the hardware layer and the network address layer, the rogue may be tricked into sending a response. Thus, the rogue would be identified.

Figure 3A:
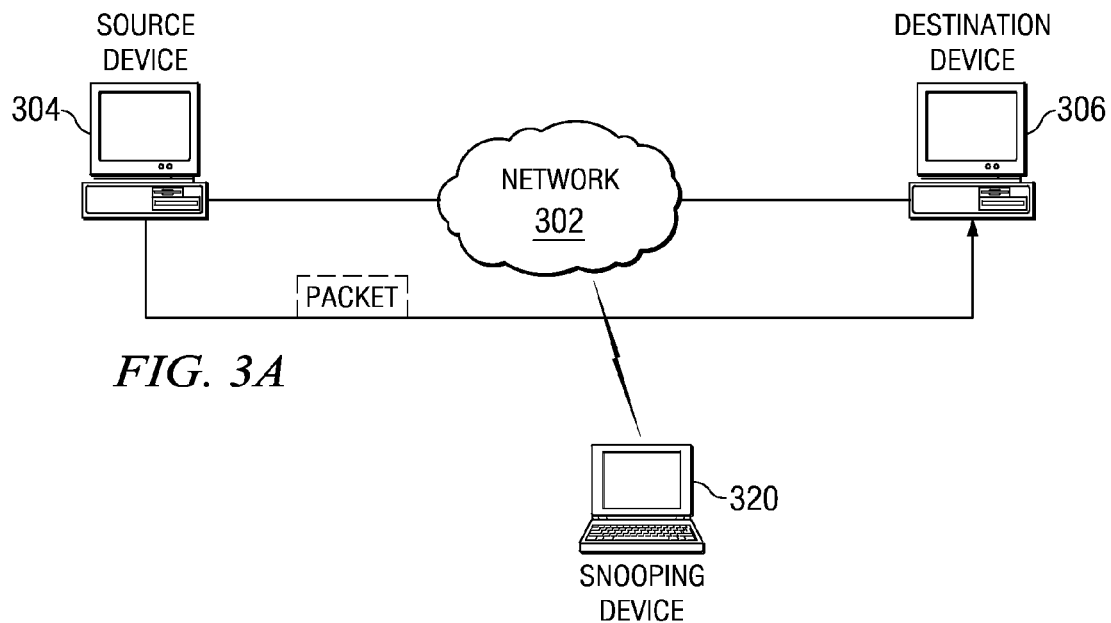
FIGS. 3A and 3B illustrate the operation of a snoop echo response extractor in accordance with exemplary aspects of the present invention.
Figure 3B:
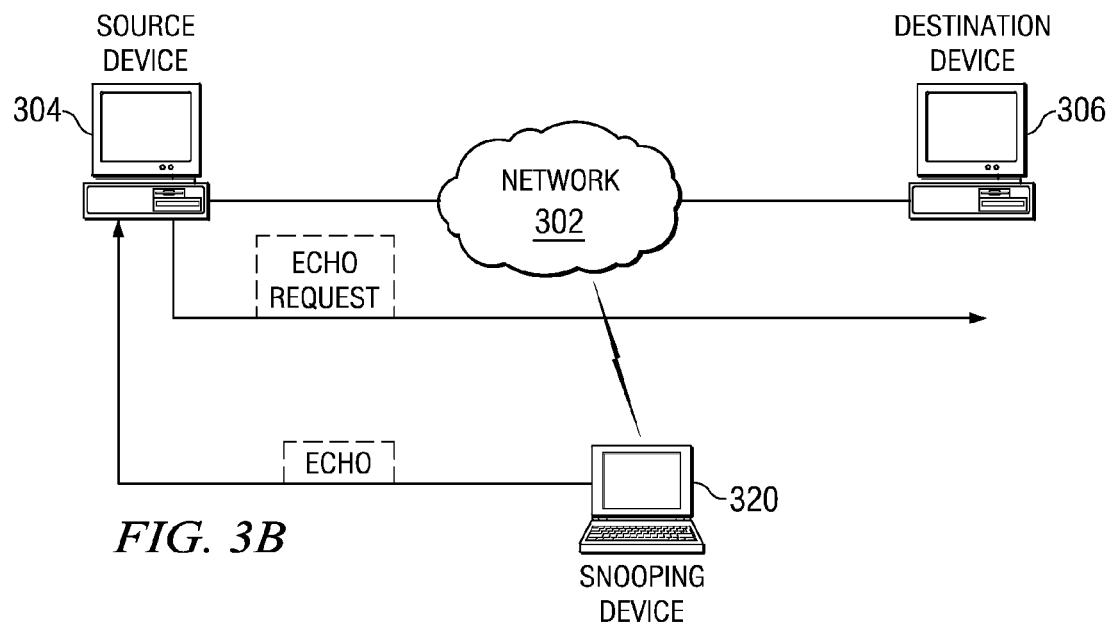

FIGS. 3A and 3B illustrate the operation of a snoop echo response extractor in accordance with exemplary aspects of the present invention. With respect to FIG. 3A, packet source device 304 sends a packet to packet destination device 306 via network 302. The packet includes routing information. This routing information includes a destination Media Access Control (MAC) address and a destination Internet Protocol (IP) address. A MAC address is a unique serial number that is burned into Ethernet and Token Ring adapters that identifies a network interface card (NIC) from all others. The MAC address is a hardware address, while the IP address is the Internet protocol, or network software, address. Further details of packet routing may be found in the International Standards Organization (ISO) seven-layer network model.

Packet source device 304 must first identify the MAC address of destination device 306 before constructing the packet to send. The operating system of source device 304 sends an address resolution protocol (ARP) call to obtain the MAC address of the destination device. If packet destination device 306 is not local, the operating system of source device 304 sends the packet to the router, which in turn makes an ARP call on the network. If the router gets an ARP response, it sends the packet directly to the MAC address. If the router does not get a response, then it sends the packet to another router.

Snooping device 320 is a computing device that executes in snoop mode, meaning snooping device 320 receives packets intended for other devices. That is, unlike a typical computing device that only receives packets that have a destination MAC address that matches its own configured MAC address, snooping device 320 receives packets regardless of the MAC address. This is also referred to as running the network interface card (NIC) in promiscuous mode. In the example shown in FIG. 3A, snooping device 320 receives the packet intended for packet destination device 306.

Turning to FIG. 3B, source device 304 generates an echo request packet. An echo request is also known as a "ping," which is short for packet Internet groper. Ping is an Internet utility that is used to determine whether a particular IP address is reachable online by sending out a packet and waiting for a response. Ping may also be used to test and debug a network, as well as to see if a user or server is online.

In accordance with exemplary aspects of the present invention, sending device 304 sends an echo request with a bogus destination MAC address and a valid IP address or an Ethernet broadcast address. Therefore, the only way the IP address will be examined is if a device ignores the MAC address and reads the packet. In other words, the only a snooping device would respond to an echo request that is MAC addressed to another destination.

In the depicted example, a "bogus" or "altered" MAC address is used. In order to detect some devices, a "broadcast" or "multicast" MAC address is required. This leads to the snooping device responding to the ping in unique manners depending on the device. For example the device may respond two times when snooping and only once when not snooping. A broadcast address typically may be used to transmit a request for address resolution or to advertise services to every node on the network or to a portion of the network. A multicast address typically is used to transmit a message to multiple recipients at the same time. Multicast is a one-to-many transmission similar to broadcasting, except that multicasting means sending to specific groups, whereas broadcasting implies sending to everybody.

In the depicted example, snooping device 320 ignores the destination MAC address at the hardware layer and forwards the packet to the Internet protocol layer. In this case, the IP address is a valid IP address for snooping device 320. This may be accomplished by cycling through all addresses in a subnet or by using a broadcast IP address, as will be described below. Since the IP address is valid for snooping device 320, the snooping device processes the packet and returns an echo packet.

Figure 4:
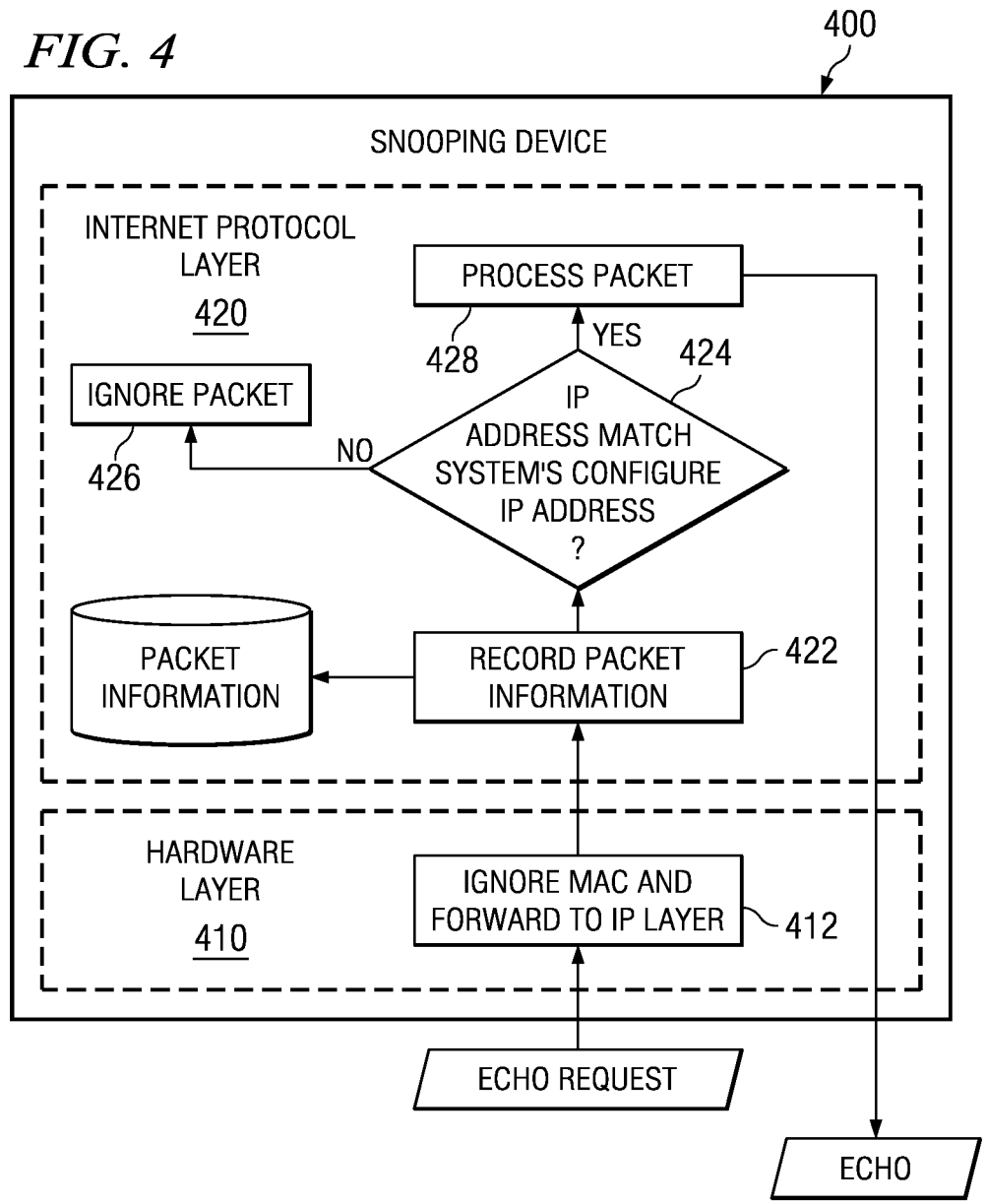
FIG. 4 is a block diagram illustrating a snooping device in accordance with exemplary aspects of the present invention.

FIG. 4 is a block diagram illustrating a snooping device in accordance with exemplary aspects of the present invention. Snooping device 400, which is illustrated in FIG. 4, is a device running in promiscuous mode. Such a snooping device operates in a known manner. However, due to the snoop echo response extraction technique of the present invention, snooping device 400 is "fooled" into responding to an echo request, thus identifying itself as a device running in promiscuous mode.

Snooping device 400 includes hardware layer 410 and Internet protocol layer 420. Hardware layer 410 may be a network interface card (NIC), for example. Snooping device 400 receives an echo request at hardware layer 410. In step 412, hardware layer 410 ignores the destination MAC address of the packet and forwards the packet to IP layer 420.

In step 422, IP layer 420 records the packet information. IP layer 420 determines whether the destination IP address matches the system's configured IP address in step 422. If the IP address does not match, IP layer 420 ignores the packet in step 426. However, if the IP address matches in step 424, IP layer 420 processes the packet in step 428. In the case of an echo request, the result of processing the packet is that IP layer 420 generates an echo response, which is returned on the network via hardware layer 410.

Thus, it is a goal of the present invention to generate an echo request with an IP address that will be processed by snooping device 400. One way to achieve this goal is to cycle through all of the IP addresses in a subnet, sending an echo request for each IP address. However, some of the IP addresses will be used by legitimate devices; therefore, according to an exemplary aspect of the present invention, the sending device uses a bogus MAC address. Only a promiscuous device will receive a packet with a bogus destination MAC address. When an echo request is sent with a destination IP address matching a configure IP address of snooping device 400, snooping device 400 will process the packet and return an echo response.

Another way of extracting an echo response, according to another exemplary embodiment of the present invention, is to generate an echo request packet with a bogus MAC address and a broadcast IP address. Every device on the network would process such a packet if it were to receive the packet. However, the hardware layer of a legitimate device would ignore such a packet due to the bogus destination MAC address. Nevertheless, snooping device 400 would ignore the MAC address and forward the packet to the IP layer for processing. Since the broadcast IP address is valid for device 400, snooping device 400 would process the packet and return an echo response.

FIGS. 5A-5C illustrate example echo request packets in accordance with exemplary aspects of the present invention. More particularly, FIG. 5A illustrates a typical echo response packet. The packet shown in FIG. 5A includes a source MAC address and a destination MAC address.

Turning to FIG. 5B, the destination MAC address is set to a bogus MAC address. Thus, any device that responds to the echo request packet of FIG. 5B must be operating in snoop mode. Also note that the packet in FIG. 5B has a valid destination IP address. In order for the packet to be processed, the receiving device must see an IP address that matches the configured IP address of the device. In accordance with one exemplary embodiment of the present invention, the sending device repeatedly generates and sends echo request packets, cycling through the IP addresses in a subnet.

With reference now to FIG. 5C, an echo response message is generated using a broadcast IP address. Again, the destination MAC address is a bogus MAC address. Therefore, a response will not be received unless a device connected to the network is operating in snoop mode. In the example shown in FIG. 5C, the destination IP address is set to a broadcast IP address. In the depicted example, the broadcast IP address is "255.255.255.0"; however, the broadcast IP address may vary depending on the network configuration.

FIG. 6 is a flowchart illustrating operation of a snoop echo response extractor using cycled IP addresses in accordance with an exemplary embodiment of the present invention. FIG. 7 is a flowchart illustrating operation of a snoop echo response extractor using a broadcast IP address in accordance with an exemplary embodiment of the present invention. It will be understood that each block of the flowchart illustrations, and combinations of blocks in the flowchart illustrations, can be implemented by computer program instructions.

These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be embodied in a computer-readable memory, storage, or transmission medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and computer usable program code for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With particular reference to FIG. 6, operation of a snoop echo response extractor is illustrated. Operation begins and the snoop echo response extractor selects a next valid address in a subnet (block 602). The snoop echo response extractor generates an echo response packet with a bogus MAC address (block 604) and sends the echo response packet to the selected address (block 606). Next, the snoop echo response extractor determines whether an echo response is received (block 608).

If an echo response is not received, the snoop echo response extractor determines whether the last address in the subnet has been considered (block 610). If the last address has been considered, operation ends. If the last address has not been considered in block 610, operation returns to block 602 to select the next address in the subnet. This process cycles until all addresses in the subnet have been considered.

If an echo response is received in block 608, the snoop echo response extractor identifies the promiscuous device (block 612). Then, operation proceeds to block 610 to determine whether the last address in the subnet has been considered, as described above. The offending device may be identified in block 612 by examining the echo response packet for a source IP address, for example. Having identified a promiscuous device, corrective action may be taken. Perhaps a computing device connected to the network is simply operating in error. If a snooping device is identified, an investigation may be conducted to locate the offending device or to block all traffic from the device, thus preventing the device from accessing resources connected to the network.

With reference to FIG. 7, operation of a snoop echo response extractor using a broadcast IP address is illustrated. Operation begins and the snoop echo response extractor generates an echo response packet with a bogus MAC address (block 702) and a broadcast IP address. Then, the snoop echo response extractor sends the echo response packet to the broadcast IP address (block 704). Next, the snoop echo response extractor determines whether an echo response is received (block 706).

If an echo response is not received, operation ends. If an echo response is received in block 706, the snoop echo response extractor identifies the promiscuous device (block 708) and operation ends. The offending device may be identified in block 708 by examining the echo response packet for a source IP address, for example. Having identified a promiscuous device, corrective action may be taken. Perhaps a computing device connected to the network is simply operating in error. If a snooping device is identified, an investigation may be conducted to locate the offending device or to block all traffic from the device, thus preventing the device from accessing resources connected to the network.

Thus, the present invention solves the disadvantages of the prior art by providing a mechanism for identifying a snooping device in a network environment. A snoop echo response extractor generates an echo request packet with a bogus MAC address that will only be received by a snooping device. The snoop echo response extractor also uses an IP address that will cause the snooping device to respond to the echo request.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for extracting a response from a snooping device in a computer network, the computer implemented method comprising:
    generating, by a packet source device in the computer network, an Internet Control Message Protocol echo request packet comprising a source hardware address and a source network protocol address of the packet source device, a bogus destination hardware address, and a valid destination network protocol address to elicit an Internet Control Message Protocol echo response from the snooping device;
    sending, by the packet source device, the Internet Control Message Protocol echo request packet to one or more devices in the computer network;
    responsive to receiving an Internet Control Message Protocol echo response packet at the packet source device in the computer network, identifying, by the packet source device, a presence of the snooping device among the one or more devices; and
    examining the Internet Control Message Protocol echo response packet to identify a source network address of the snooping device.

2. The computer implemented method of claim 1, wherein generating the Internet Control Message Protocol echo request packet includes selecting the source network protocol address from a subnet, the computer implemented method further comprising:
    cycling through network protocol addresses in the subnet and generating an Internet Control Message Protocol echo request packet for each of a plurality of network protocol addresses in the subnet.

3. The computer implemented method of claim 1, wherein the source network protocol address is a broadcast address.

4. The computer implemented method of claim 1, wherein the bogus destination hardware address is a bogus Media Access Control address.

5. The computer implemented method of claim 1, wherein the source network protocol address is an Internet protocol address.

6. The computer implemented method of claim 1, further comprising:
    blocking all network traffic originating from the source network address of the snooping device.

7. An apparatus for extracting a response from a snooping device in a computer network, the apparatus comprising:
    a processor;
    a network adapter operatively coupled to the processor; and
    a memory operatively coupled to the processor, wherein the memory has computer instructions stored therein, wherein the processor, under control of the computer instructions, generates an Internet Control Message Protocol echo request packet comprising a source hardware address and a source network protocol address of a packet source device, a bogus destination hardware address, and a valid destination network protocol address to elicit an Internet Control Message Protocol echo response from the snooping device, sends the Internet Control Message Protocol echo request packet to one or more devices in the computer network using the network adapter, identifies a presence of the snooping device among the one or more devices responsive to receiving an Internet Control Message Protocol echo response packet at the packet source device in the computer network, and examines the Internet Control Message Protocol echo response packet to identify a source network address of the snooping device.

8. The apparatus of claim 7, wherein the processor selects the source network protocol address from a subnet; and
    cycles through network protocol addresses in the subnet and generates an Internet Control Message Protocol echo request packet for each of a plurality of network protocol addresses in the subnet.

9. The apparatus of claim 7, wherein the source network protocol address is a broadcast address.

10. The apparatus of claim 7, wherein the bogus destination hardware address is a bogus Media Access Control address.

11. The apparatus of claim 7, wherein the source network protocol address is an Internet protocol address.

12. The apparatus of claim 7, wherein the processor blocks all network traffic originating from the source network address of the snooping device.

13. A computer program product for extracting a response from a snooping device in a computer network, the computer program product comprising:
a non-transitory computer usable storage medium having computer usable program code stored thereon, the computer usable program code configured to:
    generate an Internet Control Message Protocol echo request packet comprising a source hardware address and a source network protocol address of a packet source device, a bogus destination hardware address, and a valid destination network protocol address to elicit an Internet Control Message Protocol echo response from the snooping device;
    send the Internet Control Message Protocol echo request packet to one or more devices in the computer network;
    identify a presence of the snooping device among the one or more devices responsive to receiving an Internet Control Message Protocol echo response packet at the packet source device in the computer network; and
    examine the Internet Control Message Protocol echo response packet to identify a source network address of the snooping device.

14. The computer program product of claim 13, wherein the computer usable program code configured to generate the Internet Control Message Protocol echo request packet includes computer usable program code configured to select the source network protocol address from a subnet, and wherein the computer usable program code further comprises:
    computer usable program code configured to cycle through network protocol addresses in the subnet and generate an Internet Control Message Protocol echo request packet for each network protocol address in the subnet.

15. The computer program product of claim 13, wherein the source network protocol address is a broadcast address.

16. The computer program product of claim 13, wherein the bogus destination hardware address is a bogus Media Access Control address.

17. The computer program product of claim 13, wherein the source network protocol address is an Internet protocol address.

18. The computer program product of claim 13, wherein the computer usable program code further comprises:

computer usable program code configured to block all network traffic originating from the source network address of the snooping device.

19. The computer implemented method of claim 1, wherein the snooping device ignores the bogus destination hardware address in the Internet Control Message Protocol echo request packet, processes the Internet Control Message Protocol echo request packet, and sends the Internet Control Message Protocol echo response packet to the packet source device.

20. The computer implemented method of claim 1, wherein a non-snooping device in the one or more devices discards the Internet Control Message Protocol echo request packet based on the bogus destination hardware address.

* * * * *